United States Patent
Horita et al.

(10) Patent No.: US 7,096,478 B2
(45) Date of Patent: Aug. 22, 2006

(54) OPTICAL PICKUP DEVICE WITH ELASTIC SUPPORTERS AND WITH DYNAMIC VIBRATION ABSORBING BALANCE WEIGHT BONDED IN CONCAVE PART WITH ADHESIVE AGENT

(75) Inventors: Masami Horita, Fuchu (JP); Koji Naraoka, Sayama (JP); Atsushi Tonosaki, Tachikawa (JP)

(73) Assignee: Teac Corporation, (JP)

( * ) Notice: Subject to any disclaimer, the term of this patent is extended or adjusted under 35 U.S.C. 154(b) by 691 days.

(21) Appl. No.: 09/994,932

(22) Filed: Nov. 28, 2001

(65) Prior Publication Data
US 2002/0141323 A1 Oct. 3, 2002

(30) Foreign Application Priority Data
Feb. 5, 2001 (JP) ............................. 2001-028720

(51) Int. Cl.
G11B 7/08 (2006.01)
G11B 7/09 (2006.01)

(52) U.S. Cl. ...................................... 720/682; 720/684
(58) Field of Classification Search ................ 720/682, 720/684, 687, 689
See application file for complete search history.

(56) References Cited
U.S. PATENT DOCUMENTS
5,050,963 A * 9/1991 Murakami .................. 359/808
5,663,843 A * 9/1997 Ezawa et al. ............... 359/824
5,781,352 A * 7/1998 Ujiie et al. .................. 359/824
5,901,133 A * 5/1999 Miyamae et al. ........... 369/247
6,052,357 A * 4/2000 Ogawa et al. ............... 720/662

FOREIGN PATENT DOCUMENTS

| JP | 2-135918 | | 11/1990 |
|----|----|----|----|
| JP | 3-144924 A | * | 6/1991 |
| JP | 07-031367 | | 2/1995 |
| JP | 10-079128 | | 3/1998 |
| JP | 2000-348358 | | 12/2000 |

OTHER PUBLICATIONS

Japanese Office Action issued by the Japanese Patent Office in the basic Japanese Patent Application No. 2001-028720 citing the above references.

* cited by examiner

Primary Examiner—Julie Anne Watko
(74) Attorney, Agent, or Firm—Andersonkkill & Olick, P.C.

(57) ABSTRACT

An optical pickup device includes a lens for projecting a light onto a recording medium, a lens holder elastically supported by a frame and holding said lens, an actuator mounted in and driving said lens holder, and a weight part balanced with a weight of said actuator.

12 Claims, 8 Drawing Sheets

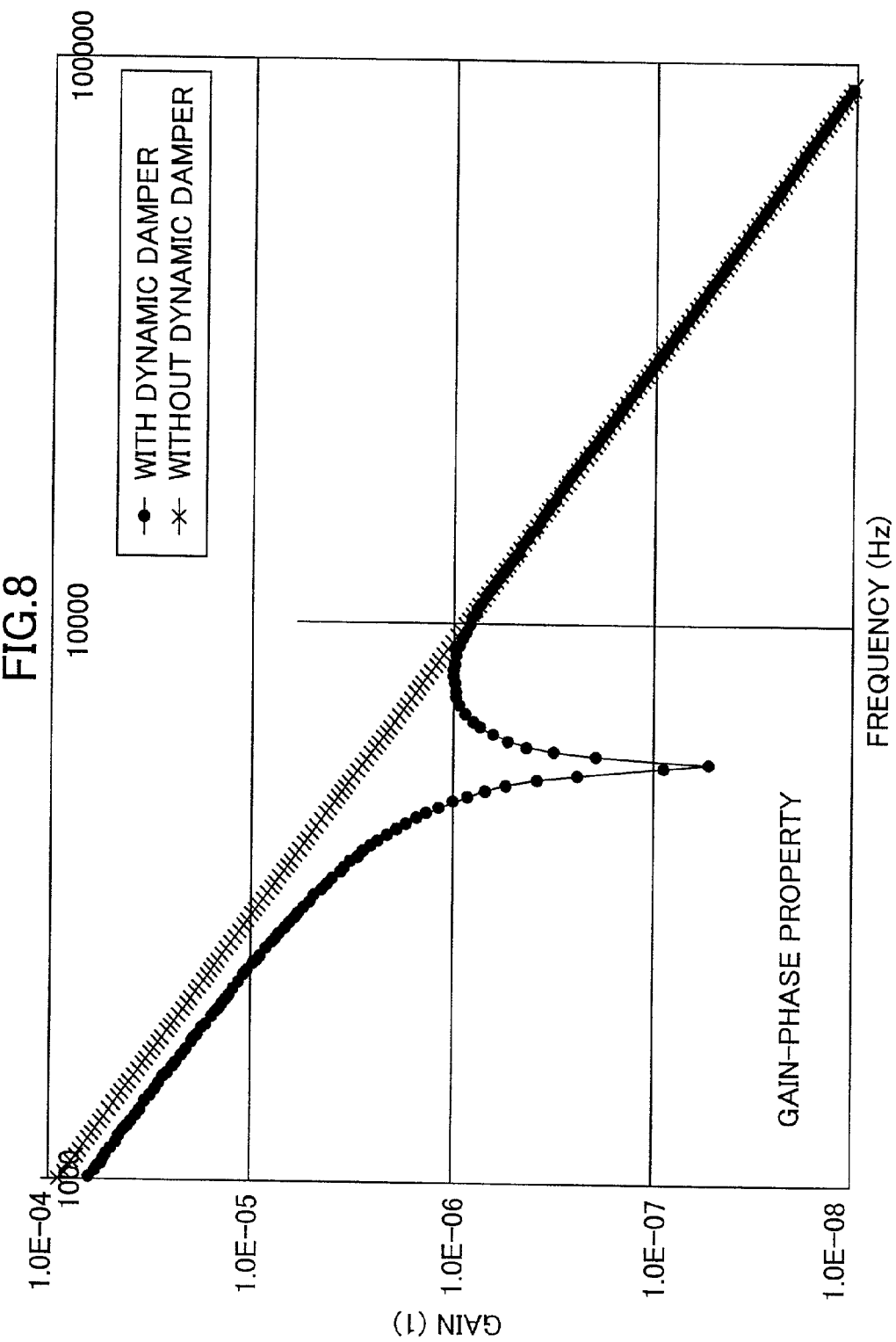

OPTICAL PICKUP DEVICE WITH ELASTIC SUPPORTERS AND WITH DYNAMIC VIBRATION ABSORBING BALANCE WEIGHT BONDED IN CONCAVE PART WITH ADHESIVE AGENT

BACKGROUND OF THE INVENTION

1. Field of the Invention

The present invention generally relates to optical pickup devices, and more particularly to an optical pickup device having a lens for projecting a light onto a recording medium and optically reading information stored in the recording medium by controlling the orientation of the lens.

2. Description of the Related Art

In a disk unit loaded with a disk recording medium (hereinafter referred to as a disk), such as a CD-ROM apparatus, for instance, information stored in the disk is read by projecting a laser beam onto the disk. An optical pickup device incorporated into this type of disk unit has an objective lens for projecting the laser beam emitted from a laser diode onto the disk, and controls the orientation of the objective lens so that the laser beam projected through the objective lens is focused on a recording surface of the disk.

That is, in the optical pickup device, focus control and tracking control are performed so that the objective lens follows the surface fluctuation of the disk or the motion of a track due to eccentricity. Such control of the objective lens is performed by an actuator utilizing electromagnetic force. Generally, the actuator is composed of a combination of a coil and a magnet.

A lens holder holding the objective lens is reduced in size and weight so that focus control and tracking control can be performed easily. Further, the lens holder is supported by a support structure where four wire-like elastic supporters are provided in parallel so that a sensitive control operation of the objective lens is performed by a driving force from the actuator.

However, the conventional optical pickup device has its movable part such as the lens holder moved easily in order to increase the accuracy of the above-mentioned focus and tracking controls. Therefore, variations in component size, for instance, cause a deviation between the center of gravity of the movable part and the driving point position of the actuator, thus generating a turning moment in the movable part. This turning moment causes unnecessary vibrations to be generated in the movable part, thus destabilizing focus and tracking controls.

Further, insufficient stiffness of the movable part due to a thinner lens holder increases the magnitude of higher-order-harmonic resonance so that a servo system starts oscillating.

Moreover, if variations in component size or assembly errors are caused, the center of gravity of the movable part or the position of a driving point on which the driving force from the actuator is exerted is deviated. Therefore, unnecessary vibrations may be caused by a turning moment generated in the movable part.

In the optical pickup device, a natural frequency may be considered to be a factor of the generation of unnecessary vibrations. Since the natural frequency is determined by a component shape and/or material, it is required to increase or decrease the level of the natural frequency by changing such a factor (factors).

Further, it is also possible to eliminate the deviation of the center of gravity of the movable part or the driving point of the actuator by increasing the processing or assembly accuracy of components. However, increasing the processing or assembly accuracy of components causes a problem of an increase in the costs of mass production.

Furthermore, in order to manage the position of the center of gravity with high accuracy, it is required to be informed quantitatively of an error between calculated and actual positions of the center of gravity by repeating trial production and evaluation. Therefore, in the case of managing the position of the center of gravity, there has been a problem that a product development period becomes longer due to repetition of the trial production and evaluation.

In addition, in order to lower the level of the natural frequency of the movable part, it is required to increase the stiffness of an individual component. However, it has been difficult to increase component stiffness by increasing component thickness due to restriction of component interference. It is possible as a method of solving such a problem to increase stiffness by forming the lens holder with a metal strip being inserted therein by insert molding. However, this causes a problem of an increase in production costs.

SUMMARY OF THE INVENTION

It is a general object of the present invention to provide an optical pickup device in which the above-described disadvantages are eliminated.

A more specific object of the present invention is to provide an optical pickup device that can reduce the magnitude of higher-order-harmonic resonance of a lens holder with a relatively simple structure.

The above objects of the present invention are achieved by an optical pickup device including a lens for projecting a light onto a recording medium, a lens holder elastically supported by a frame and holding the lens, an actuator mounted in and driving the lens holder, and a weight part balanced with a weight of the actuator.

According to the above-described optical pickup device, since the weight part balanced with the weight of the actuator is provided, the generation of a moment causing unnecessary vibrations can be controlled so that the magnitude of higher-order-harmonic resonance of the lens holder can be decreased by relatively easy work. Therefore, even if variations in component size or assembly errors are caused, the deviation of the position of center of gravity can be corrected by the weight part, and the magnitude of higher-order-harmonic resonance can be damped.

The above objects of the present invention are also achieved by an optical pickup device including a lens for projecting a light onto a recording medium, a lens holder elastically supported by a frame and holding the lens, a weight part fixed to the lens holder, and an adhesive agent fixing the weight to the lens holder, the adhesive agent having viscoelasticity such that the weight part serves as a dynamic vibration absorber.

According to the above-described optical pickup device, since the weight part is fixed to the lens holder by the adhesive agent having viscoelasticity such that the weight part serves as a dynamic vibration absorber, the generation of a moment causing unnecessary vibrations can be controlled so that the magnitude of higher-order-harmonic resonance of the lens holder can be lowered by relatively easy work. Therefore, even if variations in component size or assembly errors are caused, the deviation of the position of center of gravity can be corrected by the weight part, and the magnitude of higher-order-harmonic resonance can be damped by the dynamic vibration absorber effect produced by the viscoelasticity of the adhesive agent.

The above objects of the present invention are also achieved by an optical pickup device including a lens for projecting a light onto a recording medium, a lens holder elastically supported by a frame and holding the lens, an actuator mounted in and driving the lens holder, a weight part balanced with a weight of the actuator, and an adhesive agent fixing the weight to the lens holder, the adhesive agent having viscoelasticity such that the weight part serves as a dynamic vibration absorber.

According to the above-described optical pickup device, the same effects as those described above can be produced.

BRIEF DESCRIPTION OF THE DRAWINGS

Other objects, features and advantages of the present invention will become more apparent from the following detailed description when read in conjunction with the accompanying drawings, in which:

FIG. 8 is a diagram showing calculation results of equations for verifying a dynamic vibration absorber effect of the present invention.

DETAILED DESCRIPTION OF THE PREFERRED EMBODIMENTS

A description will now be given, with reference to the accompanying drawings, of an embodiment of the present invention.

Figure 1:
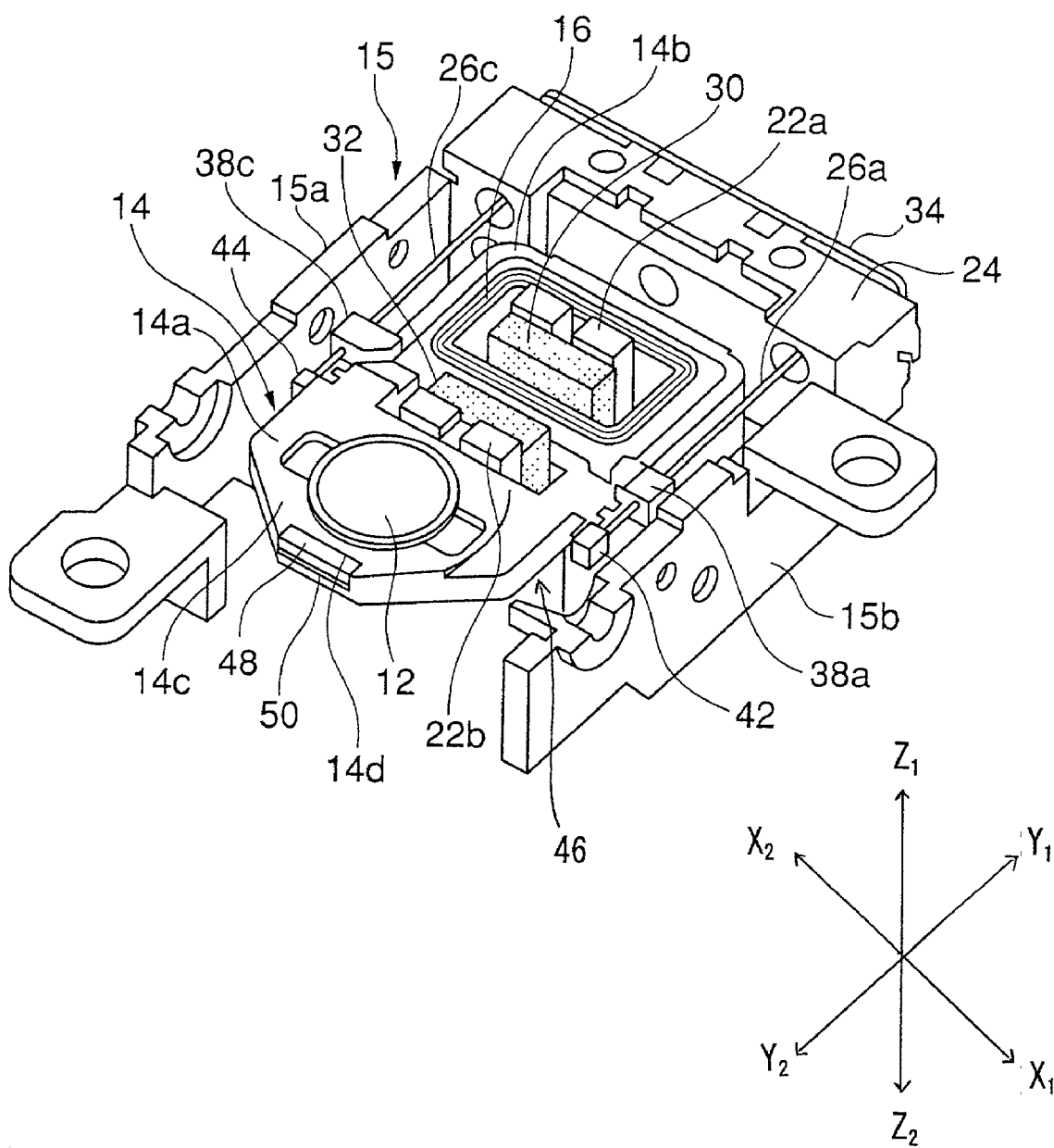
FIG. 1 is a perspective view of an embodiment of an optical pickup device of the present invention.
Figure 2:
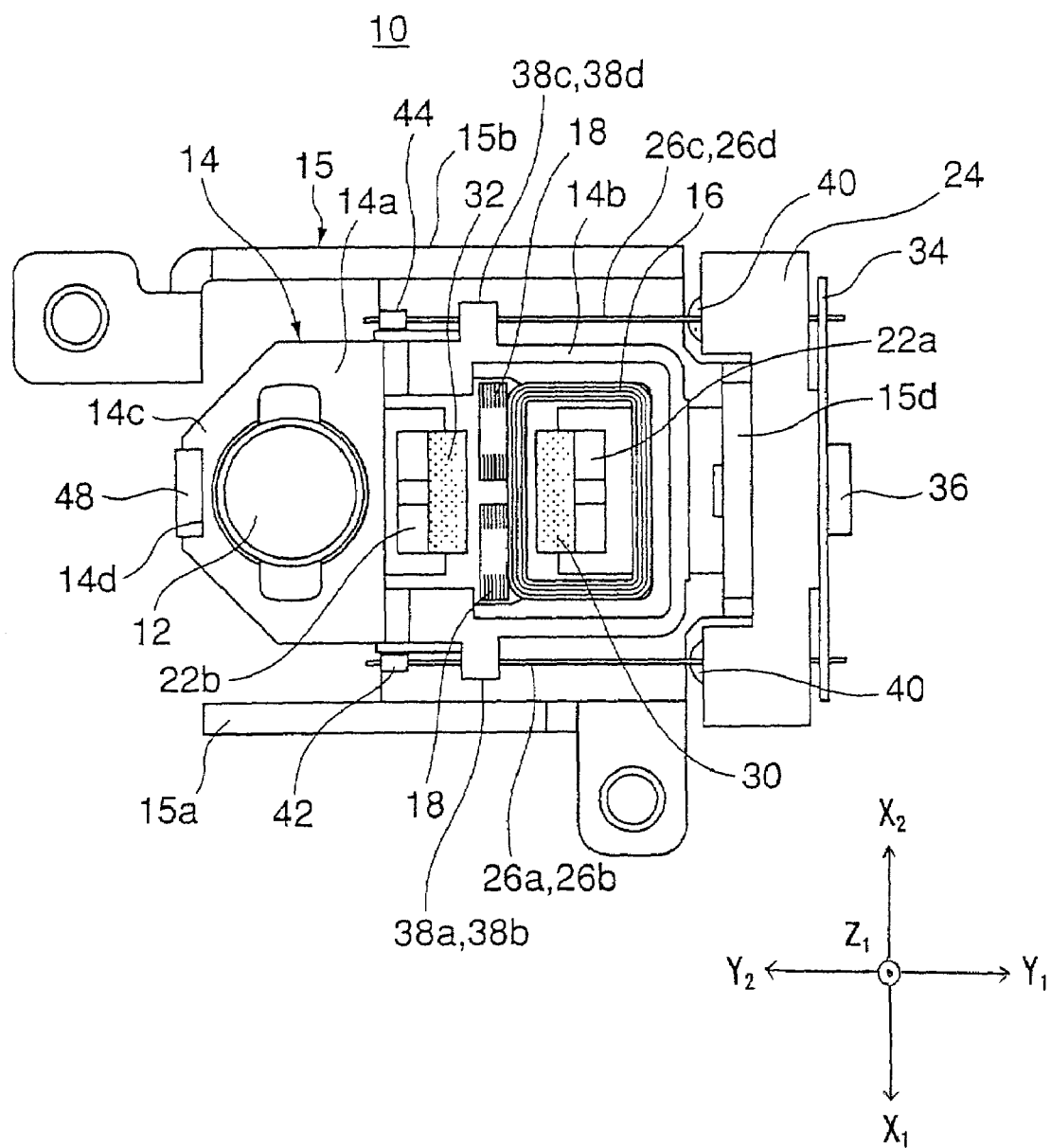
FIG. 2 is a plan view of the embodiment of the optical pickup device of the present invention.
Figure 3:
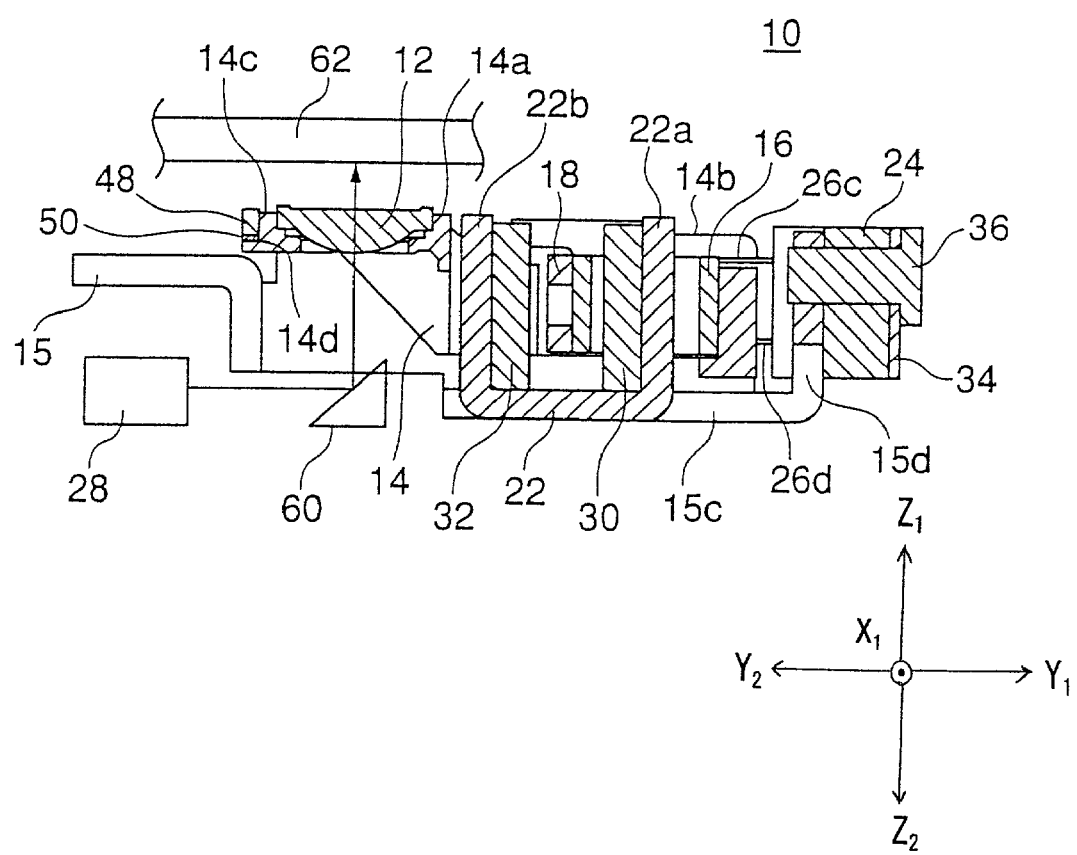
FIG. 3 is a longitudinal sectional view of the embodiment of the optical pickup device of the present invention.

FIGS. 1 through 3 are a perspective view, a plan view, and a longitudinal sectional view of an embodiment of an optical pickup device of the present invention, respectively. In FIGS. 1 through 3, directions indicated by arrows $X_1$ and $X_2$ are collectively referred to as a first lateral direction of an optical pickup device 10, directions indicated by arrows $Y_1$ and $Y_2$ are collectively referred to as a second lateral or tracking direction of the optical pickup device 10, and directions indicated by arrows $Z_1$ and $Z_2$ are collectively referred to as a vertical or focus direction of the optical pickup device 10.

As shown in FIGS. 1 through 3, the optical pickup device 10 includes an objective lens 12, a lens holder 14 supporting the objective lens 12, a yoke base (frame) 15 supporting the lens holder 14, a focus coil 16 and tracking coils 18 attached to the lens holder 14, a pair of magnets 30 and 32, a yoke 22 formed integrally with the yoke base 15 and supporting the magnets 30 and 32, a suspension holder (a support part) 24 fixed to the yoke base 15, and four wire-like elastic supporters (cantilever springs) 26a through 26d provided between the suspension holder 24 and the lens holder 14.

The focus coil 16 is an actuator for actuating the objective lens in the vertical direction, and the tracking coils 18 are an actuator for actuating the objective lens 12 in the second lateral direction. The yoke 22 bent into a U-letter shape and having a pair of arm parts 22a and 22b extending in the vertical direction is fixed to a bottom plate 15c provided between a pair of arm parts 15a and 15b of the yoke base 15 which arm parts extend in the second lateral direction. The magnet 30 is attached to the arm part 22a of the yoke 22 so as to penetrate the focus coil 16, and the magnet 32 is attached to the other arm part 22b so as to oppose the tracking coils 18.

The suspension holder 24, together with a base plate 34, is fixed to a fixing part 15d of the yoke base 15 by tightening up a screw 36. The elastic supporters 26a through 26d are arranged so as to extend in the second lateral direction with their base ends (proximal ends) penetrating the base plate 34 to be fixed and their tip parts (free ends or distal ends) penetrating respective connection parts 38a through 38d projecting from both sides of the lens holder 14 to be fixed. A silicon-based adhesive agent 40 in a gel form for elastically fixing the periphery of each of the elastic supporters 26a through 26d adheres to an end surface of the suspension holder 24. The adhesive agent 40, which is gelled by ultraviolet irradiation, provides the elastic supporters 26a through 26d with viscosity damping with respect to movements of the lens holder 14 in the focus and tracking directions.

Further, end parts of the focus coil 16 and the tracking coils 18 are connected to coil relay substrates 42 and 44 penetrated by the tip parts of the elastic members 26a through 26d so that electric currents are supplied via the elastic members 26a through 26d to the focus coil 16 and the tracking coils 18. A movable part 46 subjected to focus control and tracking control is composed of the objective lens 12, the lens holder 14, the focus coil 16, the tracking coils 18, and the coil relay substrates 42 and 44.

A laser beam emitted from a laser diode 28 is reflected from a reflecting mirror 60 to reach the objective lens 12, which focuses the laser beam on a disk 62 opposing the objective lens 12 thereabove. The magnets 30 and 32 are attached to the U-letter-shaped arm parts 22a and 22b of the yoke 22, respectively, so as to oppose each other. The magnets 30 and 32 also oppose the focus coil 16 and the tracking coils 18 provided to the lens holder 14. Further, the lens holder 14 is supported movably by the four elastic supporters 26a through 26d extending in the second lateral direction.

The objective lens 12 supported on the lens holder 14 is controlled to a position where electromagnetic forces generated in the focus coil 16 and the tracking coils 18 provided in a magnetic field produced by the magnets 30 and 32 are balanced with gravity exerted on the movable part 46.

The lens holder 14 includes a lens holding part (a free end part or distal end part) 14a for holding the objective lens 12, a coil holding part (a base end part or proximal end part) 14b extending toward the suspension holder 24 from the lens holding part 14a for holding the focus coil 16 and the tracking coils 18, and a concave part 14d formed in a tip 14c, which is formed on the lens holding part 14a on the side opposite to the side of the focus coil 16 and the tracking coils 18. The concave part 14d is formed into a rectangular shape extending in the first lateral direction in the tip 14c.

A weight (weight part) 48 formed of a rigid body and having a weight necessary to damp the vibration of the lens holder 14 is bonded and fixed to the concave part 14d by an adhesive agent 50 as a weight balancer. The weight 48 is formed of a metal material having a specific gravity higher than that of the lens holder 14, such as a brass material, and is formed into a rectangular shape to be fitted and fixed in the concave part 14d. Therefore, in bonding the weight 48, a bonding position thereof can be easily determined only by fitting the weight 48 inside the concave part 14d after applying the adhesive agent 50 thereon, thus increasing working efficiency.

Further, the weight 48 minimizes a turning moment generated in the movable part 46 (or changes the natural frequency of the lens holder 14) and controls the generation of vibration by adjusting the position of the center of gravity of the movable part 46. Moreover, since the weight 48 is formed of a material having a higher stiffness than the lens holder 14, the weight 48 serves to increase the stiffness of the lens holder 14 formed of a resin material.

Figure 4:
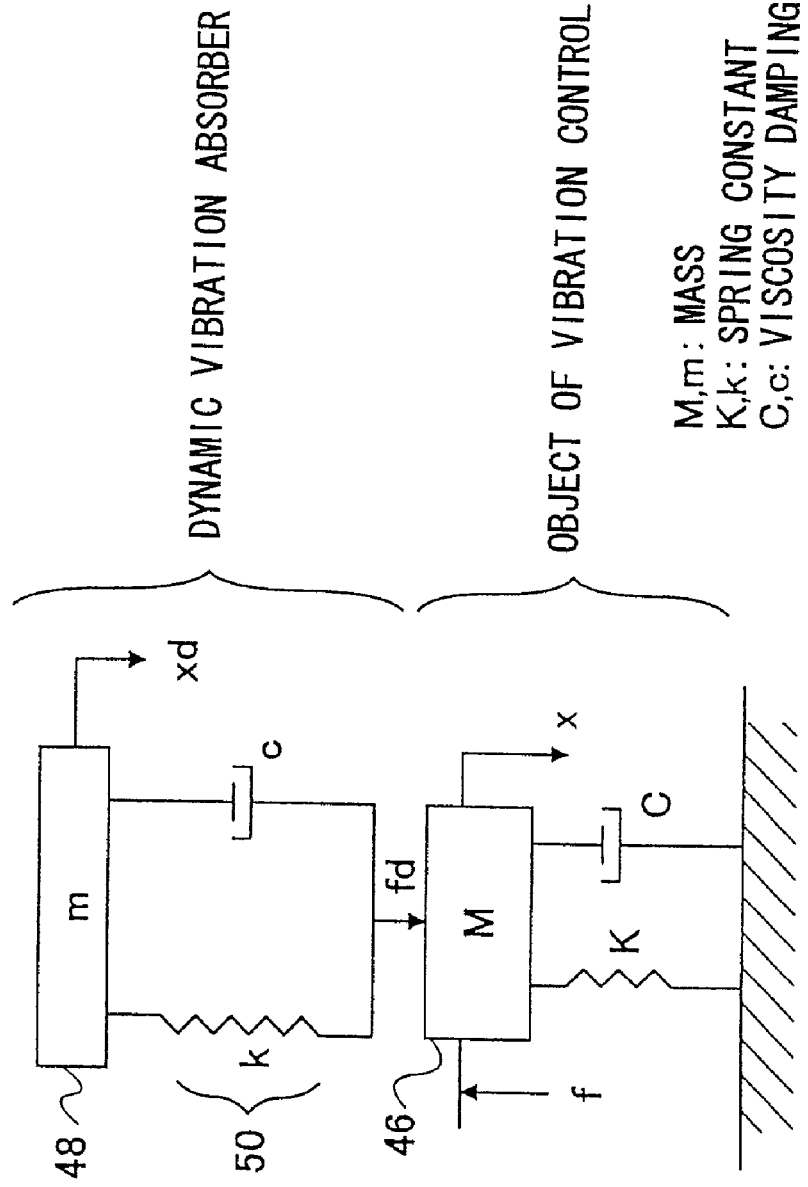
FIG. 4 is a diagram showing a physical model of a dynamic vibration absorber where a weight is attached to a tip of a lens holder.

FIG. 4 is a diagram showing a physical model of a dynamic vibration absorber where the weight 48 is attached to the tip 14c of the lens holder 14.

As shown in FIG. 4, by bonding the weight 48 to the concave part 14d formed in the tip 14c of the lens holder 14, the adhesive agent 50 generates viscoelasticity so that the weight 48 serves as a dynamic vibration absorber that damps vibration with respect to the vibration mode of the movable part 46. The dynamic vibration absorber has a mass m of the weight 48, a spring constant k of the adhesive agent 50, and a viscosity damping coefficient c of the adhesive agent 50.

In the case of using a UV-hardening-type silicon-based TB3168 (damping gel) as the adhesive agent 50, the constants of the physical model of FIG. 4, for instance, are as follows:

m=3 mg, k=3680 Pa, c=3385 Pa·s, M=300 mg, K=490 Pa, and C=0.14 Pa·s.

Therefore, the weight 48 is allowed to have the function of a dynamic vibration absorber to damp the vibration of the movable part 46 by being bonded to the tip 14c of the lens holder 14. Further, the rectangular weight 48 is bonded to the tip 14c of the lens holder 14 so as to increase the stiffness thereof, thereby reducing amplitude at the time of occurrence of vibrations.

Figure 5:
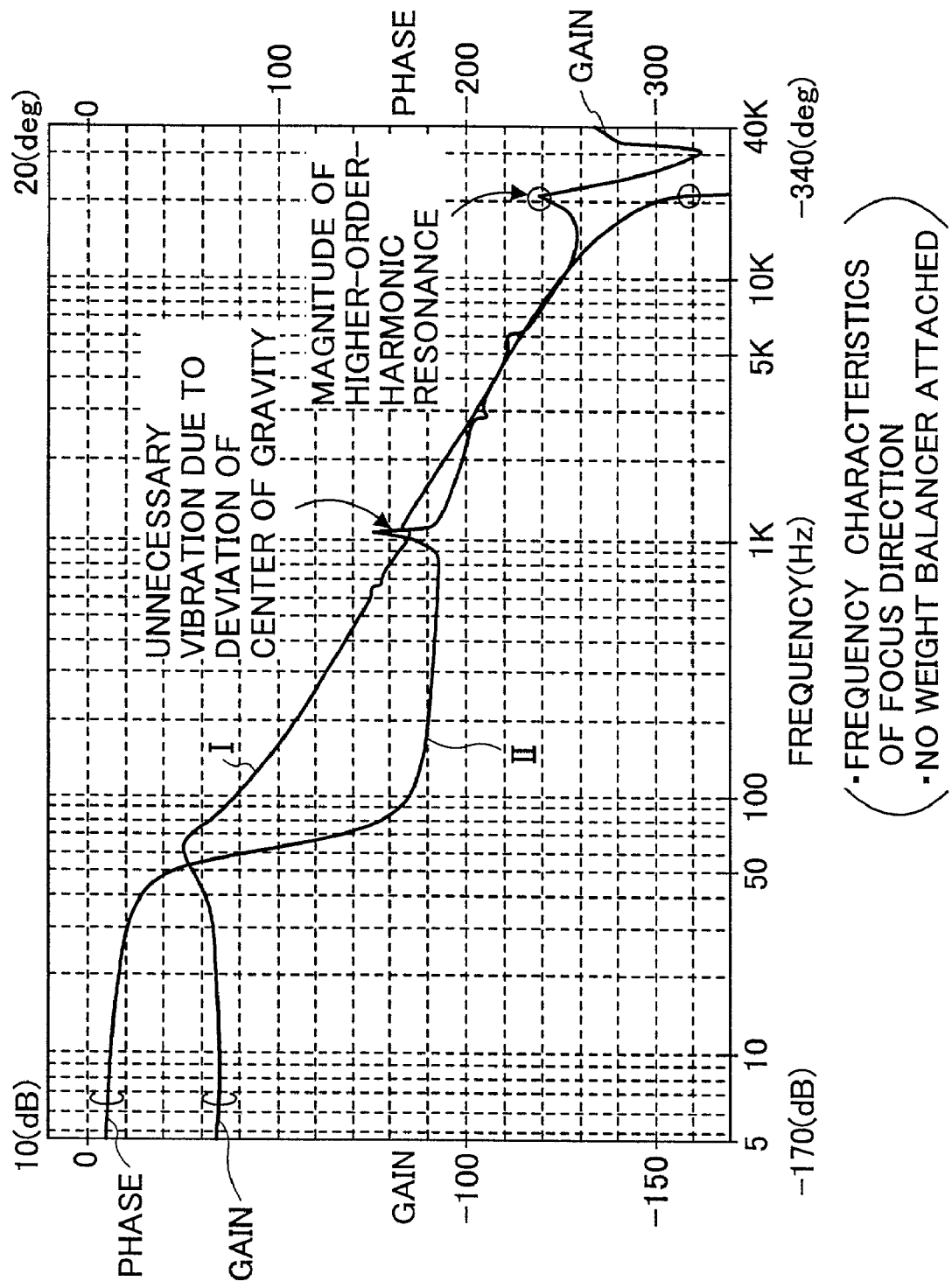
FIG. 5 is a graph showing conventional frequency characteristics of a focus direction.

FIG. 5 is a graph showing conventional frequency characteristics of the focus direction.

In FIG. 5, a curve I shows a relationship between a "frequency" and a "displacement amount per unit voltage" and a curve II shows a relationship between the "frequency" and a "phase" at the time of inputting a driving current with a sine wave to the focus coil of a conventional optical pickup device.

The curve I shows that higher-order-harmonic resonance occurs in the neighborhood of 20 KHz in the conventional optical pickup device. Further, the curve II shows that an unnecessary vibration A is generated in the neighborhood of 1 KHz due to the deviation of center of gravity in the conventional optical pickup device.

On the other hand, in the optical pickup device 10 of the present invention, since the weight 48 is bonded to the concave part 14d formed in the tip 14c of the lens holder 14, the weight 48 adjusts the deviation of the center of gravity and serves as a dynamic vibration absorber to damp vibration, as previously described.

Figure 6:
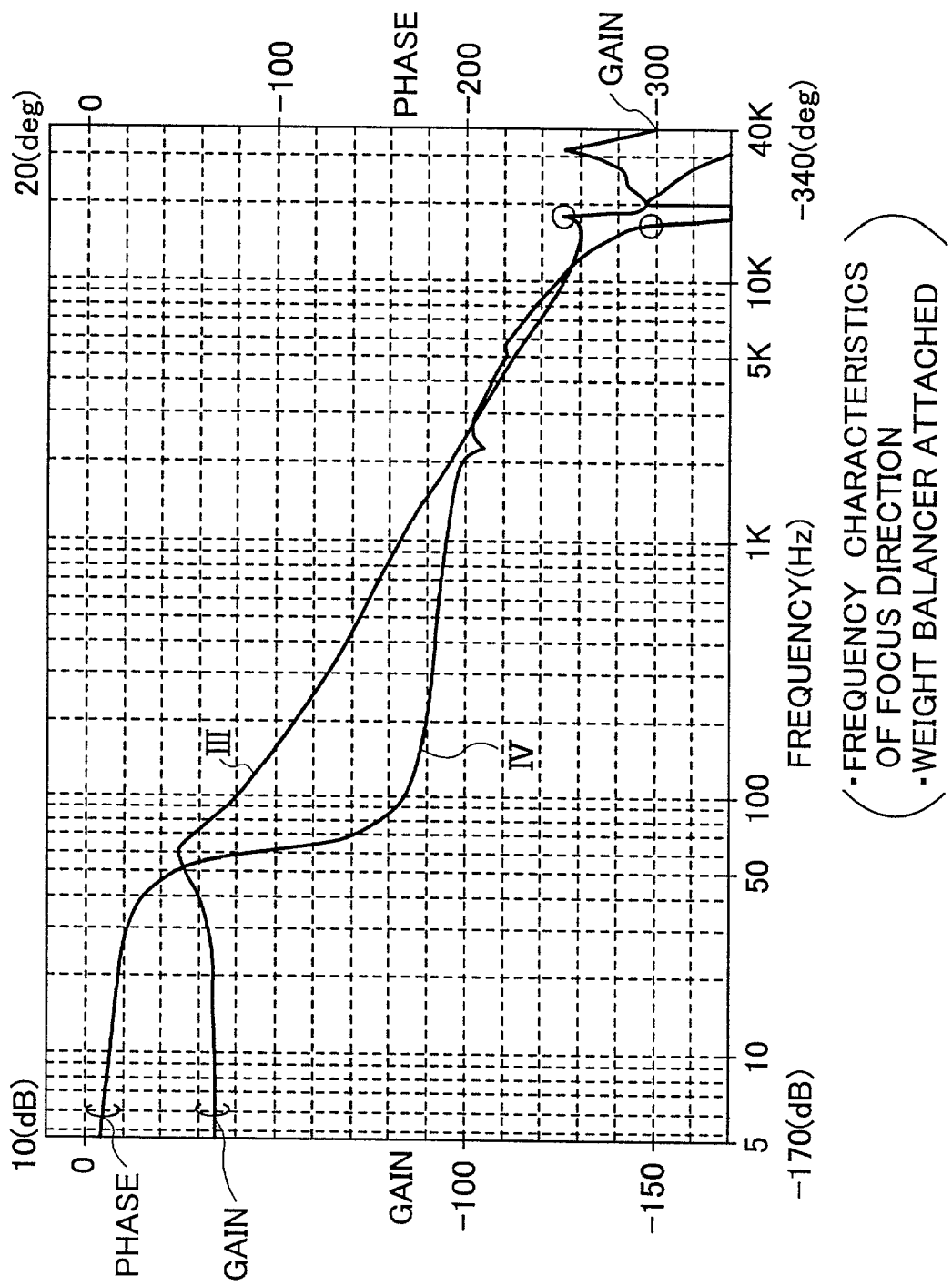
FIG. 6 is a graph showing frequency characteristics of a focus direction according to the present invention.

FIG. 6 is a graph showing frequency characteristics of the focus direction according to the present invention.

In FIG. 6, a curve III shows a relationship between a "frequency" and a "displacement amount per unit voltage" and a curve IV shows a relationship between the "frequency" and a "phase" at the time of inputting a driving current with a sine wave to the focus coil 16 of the optical pickup device 10.

The curve III shows that the magnitude of higher-order-harmonic resonance is improved in the optical pickup device 10. The curve IV shows that the unnecessary vibration A due to the deviation of the center of gravity is scarcely generated in the optical pickup device 10.

Therefore, by bonding the weight 48 to the tip 14c of the lens holder 14, the higher-order-harmonic resonance in the neighborhood of 20 KHz is improved by approximately 5 dB. Further, a phase shift in the neighborhood of 1 KHz is improved by approximately 20 degrees.

In the above-describe embodiment, the rectangular weight 48 is bonded to the tip 14c of the lens holder 14. However, a weight shape is not limitedly rectangular, and a weight of another shape may be used. Further, as for a weight material, a material other than a metal, such as a resin material having high stiffness and high specific gravity, may naturally be used.

Here, a description will be given of the theoretical background of using a weight balancer as a dynamic balancer in order to verify the dynamic vibration absorber effect produced by the present invention.

Figure 7A:
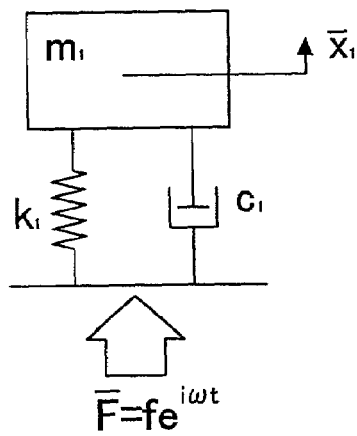
FIGS. 7A and 7B are diagrams for illustrating a theoretical background of using a weight balancer as a dynamic balancer.
Figure 7B:
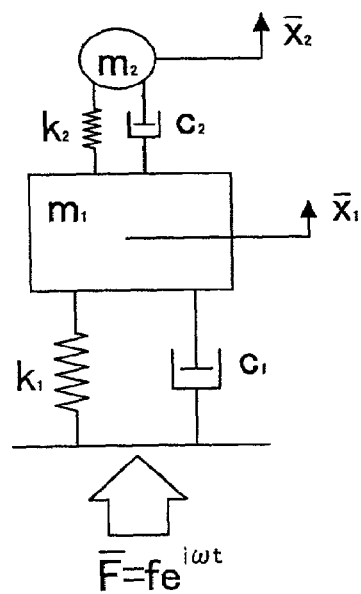

The effect of using a weight balancer as a dynamic balancer can be obtained by finding and comparing forced vibration solutions $x_1$ and $x_2$ of a one-degree-of-freedom system shown in FIG. 7A and a two-degree-of-freedom system shown in FIG. 7B.

For simplicity purposes, complex notation is used in what follows. A complex variable is distinguishably expressed as $\bar{z}$, and the fact that a stationary solution $\bar{x}_j$ converges to $\bar{x}_j = \bar{A}_j e^{i\omega t}$ if a forced external force $\bar{F}$ satisfies $\bar{F} = fe^{i\omega t}$ is used.

From a differential relationship, the following expressions are self-evident.

$$\begin{cases} \dot{\bar{x}}_j = i\omega \bar{A}_j e^{i\omega t} \\ \ddot{\bar{x}}_j = -\omega^2 \bar{A}_j e^{i\omega t} \end{cases}$$

(A) Forced Vibration Solution of the One-degree-of-freedom System

An equation of motion is:

$$m_1 \ddot{\bar{x}}_1 + c_1 \dot{\bar{x}}_1 + k_1 \bar{x}_1 = fe^{i\omega t}$$

Since $\bar{x}_1 = \bar{A}_1 e^{i\omega t}$, $$(-\omega^2 m_1 + i\omega c_1 + k_1)\bar{A}_1 = f$$

$$\therefore \frac{\bar{A}_1}{f} = \frac{1}{(k_1 - \omega^2 m_1) + i(\omega c_1)} \quad (1)$$

(B) Forced Vibration Solution of the Two-degree-of-freedom System

Equations of motion are:

$$\begin{cases} m_1 \ddot{\bar{x}}_1 + c_1 \dot{\bar{x}}_1 + k_1 \bar{x}_1 + c_2(\dot{\bar{x}}_1 - \dot{\bar{x}}_2) + k_2(\bar{x}_1 - \bar{x}_2) = fe^{i\omega t} \\ m_2 \ddot{\bar{x}}_2 + c_2(\dot{\bar{x}}_2 - \dot{\bar{x}}_1) + k_2(\bar{x}_2 - \bar{x}_1) = 0 \end{cases}$$

These equations are also expressed as:

$$\begin{cases} m_1\ddot{\bar{x}}_1 + (c_1+c_2)\dot{\bar{x}}_1 + (k_1+k_2)\bar{x}_1 - c_2\dot{\bar{x}}_2 - k_2\bar{x}_2 = fe^{i\omega t} \\ -c_2\dot{\bar{x}}_1 - k_2\bar{x}_1 + m_2\ddot{\bar{x}}_2 + c_2\dot{\bar{x}}_2 + k_2\bar{x}_2 = 0 \end{cases}$$

With the substitution of $\bar{x}_1 = \bar{A}_1 e^{i\omega t}$ and $\bar{x}_2 = \bar{A}_2 e^{i\omega t}$, the equations are:

$$\{-\omega^2 m_1 + i\omega(c_1+c_2) + (k_1+k_2)\}\bar{A}_1 + \{-i\omega c_2 - k_2\}\bar{A}_2 = f$$

$$\{-i\omega c_2 - k_2\}\bar{A}_1 + \{-\omega^2 m_2 + i\omega c_2 + k_2\}\bar{A}_2 = 0$$

These equations are expressed in matrices as:

$$\begin{bmatrix} (k_1+k_2-\omega^2 m_1) + i\omega(c_1+c_2) & -k_2 - i\omega c_2 \\ -k_2 - i\omega c_2 & (k_2 - \omega^2 m_2) + i\omega c_2 \end{bmatrix} \begin{bmatrix} \bar{A}_1 \\ \bar{A}_2 \end{bmatrix} = \begin{bmatrix} f \\ 0 \end{bmatrix}$$

If the above-described equation is expressed as $$T\begin{bmatrix} \bar{A}_1 \\ \bar{A}_2 \end{bmatrix} = \begin{bmatrix} f \\ 0 \end{bmatrix},$$

the determinant $\bar{D}$ of T ($\bar{D}$=det(T)) can be given by:

$$\bar{D} = \{(k_1+k_2-\omega^2 m_1) + i\omega(c_1+c_2)\} \cdot \{(k_2-\omega^2 m_2) + i\omega c_2\} -$$

$$(k_2 - i\omega c_2)^2$$

$$= \{(k_1+k_2-\omega^2 m_1)(k_2-\omega^2 m_2) - \omega^2 c_2(c_1+c_2) - k_2^2 + \omega^2 c^2\} +$$

$$i\omega\{(k_1+k_2-\omega^2 m_1)c_2 + (k_2-\omega^2 m_2)(c_1+c_2) - 2k_2 c_2\}$$

$$= \{k_1 k_2 + \omega^4 m_1 m_2 - \omega^2(m_1 k_2 + m_2(k_1+k_2) + c_1 c_2)\} +$$

$$i\omega\{(k_2 - \omega^2 m_2)c_1 + (k_1 - \omega^2(m_1+m_2))c_2\}$$

The inverse matrix $T^{-1}$ of T can be expressed by using the above-described $\bar{D}$ as follows:

$$T^{-1} = \frac{1}{\bar{D}} \begin{bmatrix} (k_2 - \omega^2 m_2) + i\omega c_2 & k_2 + i\omega c_2 \\ k_2 + i\omega c_2 & (k_1+k_2-\omega^2 m_1) - i\omega(c_1+c_2) \end{bmatrix}$$

Hence, $\begin{bmatrix} \bar{A}_1 \\ \bar{A}_2 \end{bmatrix} = T^{-1} \begin{bmatrix} f \\ 0 \end{bmatrix} = \frac{f}{\bar{D}} \begin{bmatrix} (k_2 - \omega^2 m_2) + i\omega c_2 \\ k_2 + i\omega c_2 \end{bmatrix}$ It is only $\bar{x}_1$ that is required for comparison with the one-degree-of-freedom system, and $$\frac{\bar{A}_1}{f} = \frac{(k_2 - \omega^2 m_2) + i\omega c_2}{\bar{D}} \quad (2)$$

A difference between the equations (1) and (2) can be judged to be the dynamic vibration absorber effect (dynamic damper effect).

The calculation results of the equations (1) and (2) are indicated by Xs and black circles in FIG. 8, respectively.

Suppose that a weight balancer of 3 mg is fixed by the damping gel TB3168 (tanδ=0.92, G*=500 Pa) in a PUW208 model, the dynamic damper (dynamic vibration absorber) of this model has a natural frequency of approximately 5.6 kHz and a damping effect of approximately 15 dB.

The present invention is not limited to the specifically disclosed embodiment, but variations and modifications may be made without departing from the scope of the present invention.

The present application is based on Japanese priority application No. 2001-028720 filed on Feb. 5, 2001, the entire contents of which are hereby incorporated by reference.

What is claimed is:

1. An optical pickup device, comprising:
    a lens for projecting a light onto a recording medium;
    a movable lens holder elastically supported by a frame and holding said lens;
    an actuator mounted in and driving said lens holder; and
    a weight part balanced with a weight of said actuator;
    an adhesive agent provided between the weight part and the movable lens holder so as to bond the weight part to the lens holder in such manner that the adhesive agent and the weight part vibrate together to minimize vibration of said lens holder;
    a support part fixed to the frame so as to oppose said lens holder; and
    a plurality of elastic supporters each extending along said lens holder and having a distal end engaged said lens holder and a proximal end connected to said support part,
    wherein said lens holder comprises:
    a proximal end part actuated by said actuator;
    a distal end part extending from said proximal end part in a direction away from said support part;
    connection parts provided on both sides of said proximal end part and connected to the distal ends of said elastic supporters; and
    a concave part to which said weight part is bonded, the concave part being formed in a tip part formed on a distal end side of said distal end part.

2. The optical pickup device as claimed in claim 1, wherein said elastic supporters are cantilever springs.

3. The optical pickup device as claimed in claim 1, wherein said weight part is formed of a rigid body and is bonded to a position farther in a direction toward a distal end side of said lens holder than a position to which said lens is attached.

4. The optical pickup device as claimed in claim 1, wherein said lens holder comprises:
    a first part holding said actuator;
    a second part extending from said first part and holding said lens; and
    a concave part formed in an end part of said second part, the end part being on a side opposite to that of said first part,
    wherein said weight part is fitted into said concave part.

5. The optical pickup device as claimed in claim 4, wherein said weight part and said concave part has a rectangular shape.

6. The optical pickup device as claimed in claim 1, wherein said weight part is formed of a material having a specific gravity higher than that of said lens holder.

7. The optical pickup device as claimed in claim 1, wherein said weight part is formed of a material having stiffness higher than that of said lens holder.

8. The optical pickup device as claimed in claim 1, wherein said weight part is formed of a metal material.

9. The optical pickup device as claimed in claim 1, wherein said weight part is formed of a resin material.

10. An optical pickup device, comprising:

a lens for projecting a light onto a recording medium;

a movable lens holder elastically supported by a frame and holding said lens;

a weight part fixed to said lens holder; and an adhesive agent provided between the weight part and the lens holder so as to bond said weight part to said lens holder and having viscoelasticity such that said weight part serves as a dynamic vibration absorber;

an actuator mounted in and driving said lens holder;

a support part fixed to the frame so as to oppose said lens holder; and a plurality of elastic supporters each extending along said lens holder and having a distal end engaging said lens holder and proximal end connected to said support part;

wherein said weight part is balanced with a weight of said actuator, and wherein said lens holder comprises;

a proximal end part actuated by said actuator;

a distal end part extending from said proximal end part in a direction away from said support part;

connection parts provided on both sides of said proximal end part and connected to the distal ends of said elastic supporters; and a concave part to which said weight part is bonded, the concave part being formed in a tip part formed on a distal end side of said distal end part.

11. The optical pickup device as claimed in claim 10, wherein said elastic supporters are cantilever springs.

12. The optical pickup device as claimed in claim 10, wherein said weight part is formed of a rigid body and is bonded to a position farther in a direction toward a distal end side of said lens holder than a position to which said lens is attached.

* * * * *